(12) United States Patent (10) Patent No.: US 8,311,760 B2
Hohe et al. (45) Date of Patent: Nov. 13, 2012

(54) METHOD FOR DETERMINING, SECTION AFTER SECTION, A PARAMETER-DEPENDENT CORRECTION VALUE APPROXIMATION COURSE AND SENSOR ARRANGEMENT

(75) Inventors: Hans-Peter Hohe, Heiligenstadt (DE); Michael Hackner, Hemau OT Haag (DE); Markus Stahl-Offergeld, Erlangen (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 358 days.

(21) Appl. No.: 12/678,567

(22) PCT Filed: Sep. 11, 2008

(86) PCT No.: PCT/EP2008/007472
§ 371 (c)(1),
(2), (4) Date: Apr. 16, 2010

(87) PCT Pub. No.: WO2009/036923
PCT Pub. Date: Mar. 26, 2009

(65) Prior Publication Data
US 2010/0217556 A1 Aug. 26, 2010

(30) Foreign Application Priority Data
Sep. 18, 2007 (DE) .......................... 10 2007 044 471

(51) Int. Cl.
*G06F 19/00* (2011.01)
(52) U.S. Cl. .............. 702/104; 702/41; 702/43; 702/99; 702/151; 73/862.333; 73/862.334; 73/862.191; 73/862.336; 324/207.22; 324/207.12

(58) Field of Classification Search .................... 702/41, 702/43, 99, 104, 151, 113, 115, 182; 73/862.333, 73/862.334, 862.191, 862.336, 862.335; 324/207.22, 207.12, 207.2
See application file for complete search history.

(56) References Cited

U.S. PATENT DOCUMENTS 4,215,412 A * 7/1980 Bernier et al. ................ 701/100
4,467,601 A * 8/1984 Watanabe ....................... 60/274
(Continued)

FOREIGN PATENT DOCUMENTS
DE    30 07 747 A1    9/1981
(Continued)

OTHER PUBLICATIONS

Official Communication issued in International Patent Application No. PCT/EP2008/007472, mailed on Jan. 21, 2009.

(Continued)

*Primary Examiner* — Carol Tsai
(74) *Attorney, Agent, or Firm* — Keating & Bennett, LLP

(57) ABSTRACT

An embodiment of a method for a determination, section after section, of a parameter-dependent correction value approximation course includes determining a first measurement signal value with a first parameter value associated with a sensor arrangement when the first parameter value fullfils a predetermined condition or a trigger condition is fulfilled, changing the first parameter value to obtain a second parameter value, determining a second signal value with the second parameter value and determining a second partial section of the correction value approximation course for a second parameter range based on a functional connection describing the second partial section, the first parameter value, the second parameter value, the first measurement signal value, the second measurement signal value and an initial correction value.

23 Claims, 5 Drawing Sheets

U.S. PATENT DOCUMENTS

| | | | | |
|---|---|---|---|---|
| 4,669,052 A * | 5/1987 | Bianco | ............................ | 702/104 |
| 4,697,459 A * | 10/1987 | Nonomura et al. | ...... | 73/862.333 |
| 4,750,371 A * | 6/1988 | Kobayashi et al. | ...... | 73/862.336 |
| 4,803,885 A * | 2/1989 | Nonomura et al. | ...... | 73/862.333 |
| 4,811,609 A * | 3/1989 | Nishibe et al. | ............ | 73/862.333 |
| 4,920,809 A * | 5/1990 | Yoshimura et al. | ...... | 73/862.334 |
| 5,062,062 A * | 10/1991 | Nishibe et al. | .................... | 702/41 |
| 6,199,020 B1 * | 3/2001 | Ando | ............................... | 702/41 |
| 6,396,259 B1 * | 5/2002 | Washeleski et al. | ..... | 324/207.22 |
| 6,424,928 B1 * | 7/2002 | Elliott et al. | ................... | 702/151 |
| 6,477,458 B1 * | 11/2002 | Yasui et al. | .................... | 701/109 |
| 6,615,156 B2 * | 9/2003 | Elliott et al. | ....... | 702/151 |
| 6,651,519 B2 * | 11/2003 | Wilks et al. | .............. | 73/862.191 |
| 6,847,902 B2 * | 1/2005 | Fukaya et al. | .................. | 702/43 |
| 7,110,902 B2 * | 9/2006 | Fukaya et al. | .................. | 702/99 |
| 7,493,831 B2 * | 2/2009 | Varonis | ..................... | 73/862.333 |
| 2005/0052541 A1 * | 3/2005 | Kondo | ....................... | 348/222.1 |

FOREIGN PATENT DOCUMENTS

| | | |
|---|---|---|
| DE | 196 42 699 A1 | 4/1998 |
| DE | 197 03 359 A1 | 8/1998 |
| DE | 100 52 609 A1 | 5/2002 |
| DE | 100 64 859 A1 | 7/2002 |
| EP | 1 503 181 A1 | 2/2005 |
| WO | 96/41120 A1 | 12/1996 |

OTHER PUBLICATIONS

Official Communication issued in corresponding International Application PCT/EP2008/007472, mailed on Jan. 18, 2010.

English translation of Official Communication issued in corresponding International Application PCT/EP2008/007472, mailed on Jul. 29, 2010.

* cited by examiner

METHOD FOR DETERMINING, SECTION AFTER SECTION, A PARAMETER-DEPENDENT CORRECTION VALUE APPROXIMATION COURSE AND SENSOR ARRANGEMENT

BACKGROUND OF THE INVENTION

Embodiments of the present invention relate to a method for determining a correction value approximation course of sensor arrangements, as are exemplarily used in many fields of technology.

In many sensors or sensor arrangements, corruptions of the measuring values detected using same occur due to effects caused by manufacturing, the environment, operation or other effects. Depending on the sensor, sensor type or effect, the respective corruptions may have different effects on the measuring values established. Apart from a simple offset, i.e. a shift of the respective measuring values by a constant or parameter-dependent value, more complex corruptions may also occur. Exemplarily, a ratio between a measuring quantity acting on the sensor and the respective measuring value detected by the sensor may exhibit a parameter dependence. Furthermore, a parameter-dependent non-linear characteristic curve may result between the measuring quantity acting on the sensor and the measuring value detected by the sensor.

SUMMARY

According to an embodiment, a method of determining, section after section, a parameter-dependent correction value approximation course for a measurement signal correction of a sensor arrangement, wherein with regard to an initial parameter value an initial correction value and a first parameter coefficient are given, and wherein the correction value approximation course has a first partial section for a first parameter range which is based on the initial correction value and the first parameter coefficient, may have the steps of determining a first measurement signal value with a first parameter value associated with the sensor arrangement, when the first parameter value fulfils a predetermined condition or a trigger condition is fulfilled; changing the first parameter value associated with the sensor arrangement to acquire a second parameter value associated with the sensor arrangement; determining a second measurement signal value with the second parameter value; and determining a second partial section of the correction value approximation course for a second parameter range based on a functional connection describing the second partial section considering the first and the second parameter value, the first and the second measurement signal value and the initial correction value, wherein the second partial section of the correction value approximation course is determined so that the first parameter range is adjacent to the second parameter range; and wherein the first partial section and the second partial section of the correction value approximation course are continuously adjacent to each other.

According to another embodiment, sensor arrangement may have a first sensor element for providing measurement signals; a second sensor element for providing parameter signals; and a processing circuit coupled to the first and the second sensor element and implemented to detect measurement signals from the first sensor element and parameter signals from the second sensor element and further implemented, wherein the processing circuit is further implemented to determine a first measurement signal with a first parameter value associated with the sensor arrangement and corresponding to a first parameter signal, when the first parameter value fulfils a predetermined condition or a trigger condition is fulfilled; wherein the processing circuit is further implemented to change the first parameter value associated with the sensor arrangement to acquire a second parameter value associated with the sensor arrangement and corresponding to a second parameter signal; wherein the processing circuit is further implemented to determine a second measurement signal value with the second parameter value; and wherein the processing circuit is further implemented to determine a second partial section of the correction approximation course in a second parameter range which is based on a functional connection describing the second partial section, considering the first and the second parameter value, the first and the second measurement signal value an initial correction value, wherein a first partial section of the correction value approximation course in a first parameter range is based on the predetermined initial correction value and the first predetermined parameter coefficient; wherein the second partial section of the correction value approximation course is determined so that the first parameter range is adjacent to the second parameter range; and wherein the first partial section and the second partial section of the correction value approximation course are continuously adjacent.

According to another embodiment, a program may have a program code for executing, when the program is executed on a processor, a method of determining, section after section, a parameter-dependent correction value approximation course for a measurement signal correction of a sensor arrangement, wherein with regard to an initial parameter value an initial correction value and a first parameter coefficient are given, and wherein the correction value approximation course has a first partial section for a first parameter range which is based on the initial correction value and the first parameter coefficient, which may have the steps of determining a first measurement signal value with a first parameter value associated with the sensor arrangement, when the first parameter value fulfils a predetermined condition or a trigger condition is fulfilled; changing the first parameter value associated with the sensor arrangement to acquire a second parameter value associated with the sensor arrangement; determining a second measurement signal value with the second parameter value; and determining a second partial section of the correction value approximation course for a second parameter range based on a functional connection describing the second partial section considering the first and the second parameter value, the first and the second measurement signal value and the initial correction value, wherein the second partial section of the correction value approximation course is determined so that the first parameter range is adjacent to the second parameter range; and wherein the first partial section and the second partial section of the correction value approximation course are continuously adjacent to each other.

Embodiments of the present invention are based on the finding that an improvement in measuring precision can be achieved by taking into consideration an improved correction approximation course, wherein such an improved correction approximation course may be established on the basis of a single initial correction value and a first parameter coefficient. In embodiments of the present invention, this is achieved by determining a correction approximation course section after section, wherein a first sub-section of the correction approximation course in a first parameter range is preset by a predetermined initial correction value and a first parameter coefficient relative to an initial parameter value.

If a predetermined condition of a first parameter value associated to the sensor arrangement or another triggering condition is fulfilled, at first a first measuring signal value which corresponds to the measuring value of the sensor arrangement and, at the same time, to a first measuring signal of a sensor element of the sensor arrangement will be determined. By altering the first parameter value associated to the sensor arrangement, wherein a second parameter value associated to the sensor arrangement is obtained, a second measuring signal value can be determined with this second parameter value. This allows establishing a second sub-section of the correction approximation course for a second parameter range based on a functional association describing the second sub section, the first parameter value, the second parameter value, the first measuring signal value, the second measuring signal value and the initial correction value. In embodiments of the present invention, the first parameter value is in the second parameter range underlying the second sub-section of the correction value approximation course.

In contrast to a measuring value or a measuring signal value, a correction value generally is only accessible for measuring technology under certain circumstances. Generally, such a correction value basically will no longer be accessible if the sensor or the sensor arrangement, for example, is already exposed to an influence to which the sensor or the sensor arrangement reacts by a change in its measuring signals or measuring values. This applies, in many a case, to sensors which are employed in assemblies or other technical devices. Additionally, depending on the sensor, type of the sensor and sensitivity of the sensor, the result may be that, using such a sensor, a correction value cannot be established outside a specially shielded or specially stabilized space. In order to determine a corresponding correction value, it is inevitable in many a case to measure the sensor in a space which is shielded relative to that influence to which the sensor is sensitive, or a specially stabilized space. Exemplarily, a magnetic field sensor in which, depending on the sensitivity of the sensor, determining such a correction value, such as, for example, an offset value, can only be performed in a magnetically sufficiently shielded space, since a corruption or alteration of the measuring value might be expected already due to the earth's magnetic field is to be mentioned here. Of course, corresponding corruptions may occur when measuring the absolute correction values when these are not performed in correspondingly shielded or stabilized spaces.

Other elements, features, steps, characteristics and advantages of the present invention will become more apparent from the following detailed description of the preferred embodiments with reference to the attached drawings.

BRIEF DESCRIPTION OF THE DRAWINGS

Embodiments of the present invention will be detailed subsequently referring to the appended drawings.

DETAILED DESCRIPTION OF THE INVENTION

Figure 1A:
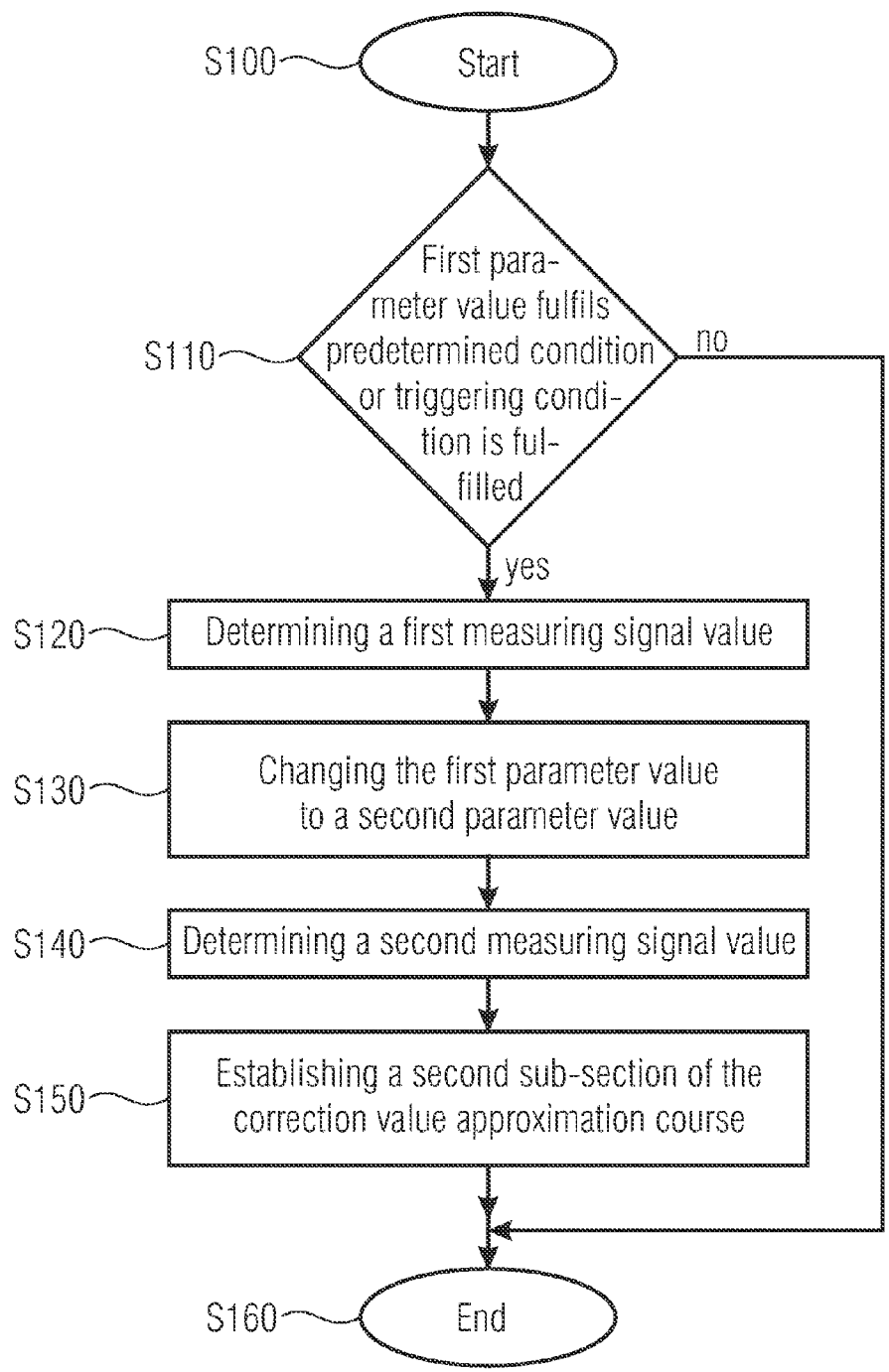
FIG. 1a shows a flowchart of an embodiment of a method for determining, section after section, a parameter-dependent correction value approximation course.

In many sensors allowing determining an influence in the form of a measuring value on a corresponding measuring quantity, the measuring values are frequently corrupted by effects which make taking correction values or correction value approximations into consideration for improving the measuring precision obtainable by the sensor advisable. The different effects resulting in a corruption of the measuring values compared to the measuring quantity acting on the sensor may result in different corruptions of the measuring values relative to the underlying measuring quantities. Apart from a simple, maybe parameter-dependent, offset, i.e. a shift of the measuring values relative to the measuring quantity, more complex corruptions may also occur. Apart from a parameter-dependent or measuring value-dependent change in a gradient of the measuring values relative to a change in the measuring quantities, more complex, such as, for example, non-linear, corruptions may also occur.

In order to counteract corruptions of this kind, it is advisable in many cases to take corresponding correction values or correction value approximations into consideration when measuring using a corresponding sensor. Correction values or correction value approximations may exemplarily be realized as additive, multiplicative or more complex corrections of the measuring values of the sensor, also referred to as sensor arrangement.

The procedure described below for determining, section after section, a parameter-dependent correction value approximation course for correcting a measuring signal of a sensor arrangement may exemplarily be employed in order to get a grip on the temperature-dependent spinning current offset of Hall sensors. The subsequent explanations, however, will make clear that the inventive procedure may be applied to all sensor arrangements infested by offset, measuring errors or error signals, wherein apart from temperature changes, pressure changes and any changing environmental influences may be considered as a sensor parameter influencing or interfering in the measuring value.

Before the embodiments of the present invention and their mode of functioning will be detailed, it is pointed out that, in order to simplify the presentation, elements, circuits and other objects having similar functions or equal functions are referred to by same or similar reference numerals. Additionally, it is pointed out here that corresponding sections of the description referring to elements, objects and circuits having similar functions or same functions, are mutually exchangeable, unless explicitly indicated otherwise. Furthermore, in order to simplify the presentation, summarizing reference numerals will be used in the further course for components occurring several times in one embodiment, unless reference is made to individual elements or objects. This also serves simplification and clearer structuring of the description.

Figure 1B:
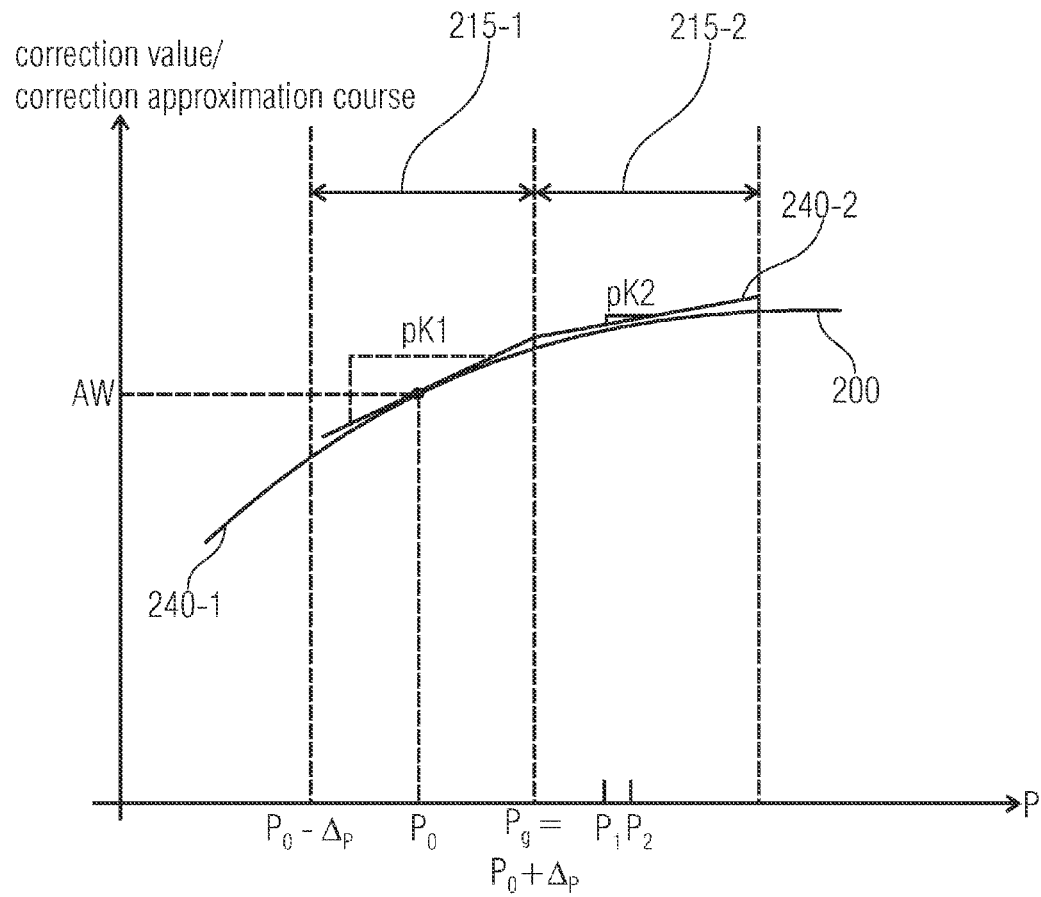
FIG. 1b shows an example of a parameter-dependent correction value approximation course as may be determined using an embodiment of a method for determining, section after section, a parameter-dependent correction value approximation course.
Figure 2:
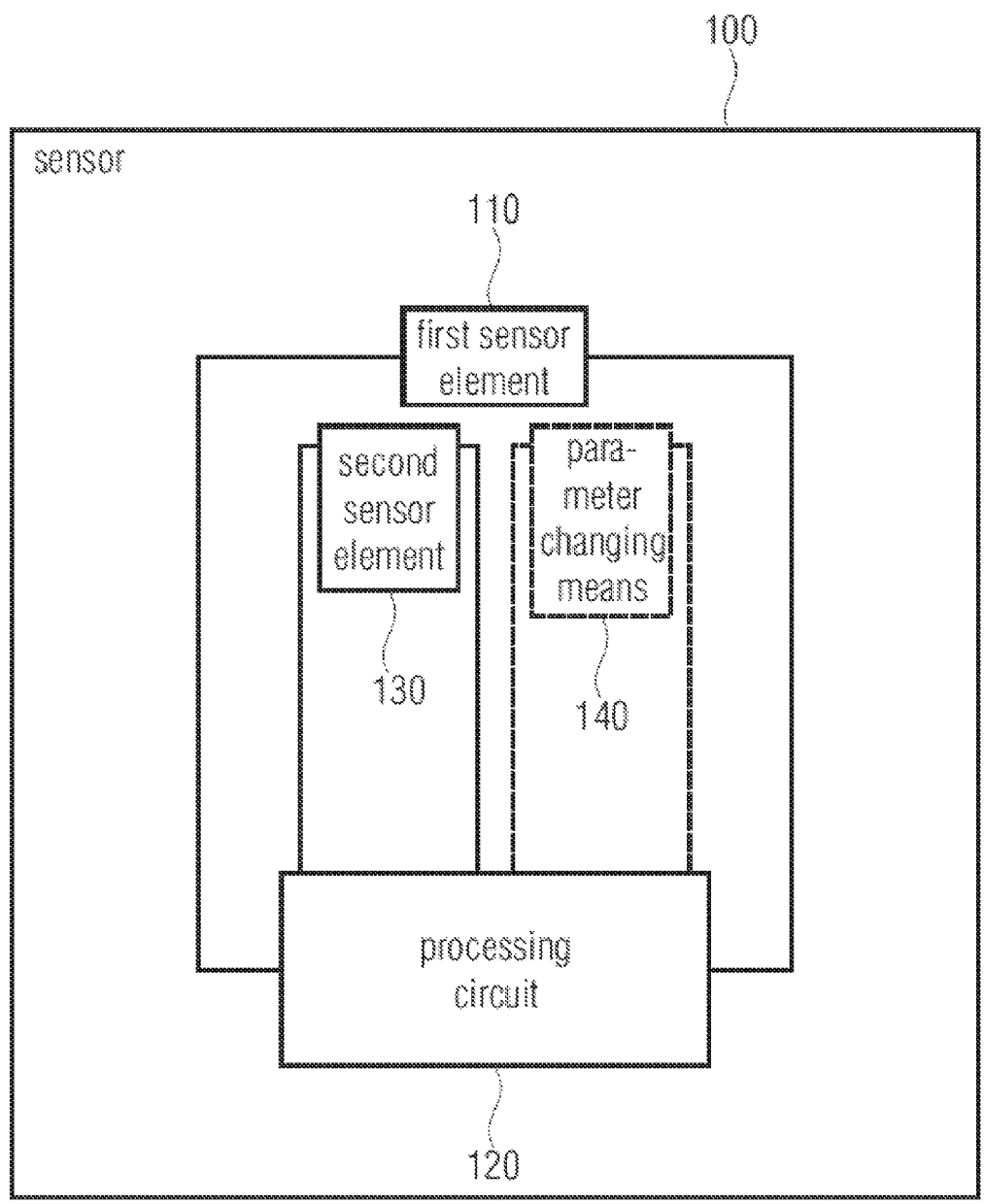
FIG. 2 shows a block diagram of an embodiment of a sensor arrangement.

When referring to FIGS. 1a, 1b and 2 to 4, a first embodiment of a method for determining, section after section, a parameter-dependent correction value approximation course is described, FIG. 1a showing a flowchart of an embodiment of this method and FIG. 1b showing an example of a corresponding parameter-dependent correction value approximation course, whereas FIG. 2 shows a corresponding sensor or corresponding sensor arrangement as a block diagram. However, at first an embodiment of an inventive method will be discussed referring to FIGS. 1a and 1b.

The embodiment of a method for determining, section after section, a parameter-dependent correction value approximation course, which is illustrated in FIG. 1a as a flowchart, is based on the fact that an initial correction value AW and a first parameter coefficient pK1 relative to an initial parameter value $p_0$ which generally is in a first parameter range 215-1 are preset, i.e. exemplarily measured in a series test and stored in the sensor. A first sub-section 240-1 of the sectioned correction value approximation course 240 is given on the basis of the first parameter coefficient pK1 and the initial correction value AW.

FIG. 1b illustrates this using a corresponding plotting of the correction value and the correction value approximation value based on the embodiment in dependence on the parameter p. Thus, FIG. 1b shows a correction value course 200, which normally is no longer accessible during measuring operation, which at the initial parameter value $p_0$ exhibits the initial correction value AW (absolute value). The initial parameter value $p_0$ is in the first parameter range 215-1 which, with regard to the parameter values p in the situation schematically shown in FIG. 1b, extends in the parameter interval between $p_0-\Delta p$ and $p_0+\Delta p$.

In the situation shown in FIG. 1b, a second parameter range 215-2 over which a second sub-section 240-2 of the correction value approximation course 240 is to be established by the embodiment of the present invention is abutting on the first parameter range 215-1 over which the first sub-section 240-1 of the correction value approximation course 240 is defined.

In the example of the present invention described here, the first and second parameter ranges 215-1, 215-2 are mutually abutting so that, potentially taking a measuring resolution with regard to the parameter values, a quantizing resolution or another resolution limit inherent to the respective sensor into consideration, there are no parameter values between the first and second parameter ranges 215-1, 215-2.

When, after starting the method (step S100), it is found out in a step S110 that a first parameter value $p_1$ associated to the sensor arrangement fulfills a predetermined condition or a triggering condition is fulfilled, in a step S120 a first measuring signal value MW1 at the first parameter value $p_1$ will be determined. Subsequently, in a step S130, the first parameter value $p_1$ associated to the sensor is changed such that a second parameter value $p_2$ will be obtained. In a step S140, a second measuring signal value MW2 is determined at the second parameter value $p_2$, whereupon in a step S150 a second sub-section 240-2 of the correction value approximation course 240 is established on the basis of a functional association describing the second sub-section 240-2, taking into consideration the first and second parameter values $p_1$ and $p_2$, the first and second measuring signal values MW1 and MW2 and the initial correction value AW, before the method ends in a step S160. If, however, it is found out in step S110 that the first parameter value does not fulfill the predetermined condition, nor is the triggering condition fulfilled, step S160 is entered directly.

Using the measuring signal values MW1 (first measuring signal value) and MW2 (second measuring signal value) determined at the parameter values $p_1$ (first parameter value) and $p_2$ (second parameter value), on the basis of the following relation:

$$pK2 = \frac{MW1 - MW2}{p_1 - p_2} \quad (1)$$

a parameter coefficient pK2 in the second parameter range 215-2 in which there is at least the parameter value $p_1$ can be established. A description of the second sub-section 240-2 of the correction value approximation course 240 which in the situation shown in FIG. 1b follows the first sub-section 240-1 of the correction value approximation course 240 continuously may be done on the basis of this parameter coefficient pK2.

In the situation shown in FIG. 1b, in the case of the two abutting parameter ranges 215-1, 215-2, the first and second sub-sections 240-1, 240-2 of the correction approximation course 240 are continuous to each other, wherein again the resolution limits already mentioned with regard to the measuring values or measuring signal may have to be taken into consideration. As will be explained later on, the parameter-dependent correction approximation course 240 determined section after section may additionally comprise one or several further or additional sub-sections with regard to one or several additional parameter ranges.

FIG. 2 shows an embodiment of the present invention implemented as a sensor 100. The sensor 100 includes a first sensor element 110 for providing measuring signals corresponding to respective measuring values. The first sensor element 110 here is coupled to a processing circuit 120 which is configured to detect the respective measuring signals. Additionally, the processing circuit 120 is coupled to a second sensor element for providing parameter signals which correspond to parameter values.

The processing circuit 120 is additionally configured to perform, based on the measuring signals, the measuring values contained therein, the parameter signals and the parameter values contained therein, the method described before for determining, section after section, a parameter-dependent correction value approximation course. Depending on the specific implementation, the sensor 100 additionally includes parameter value changing means 140 as an optional component (indicated in FIG. 2 in broken lines) capable of changing the parameter values of the first sensor element 110 which is used for the actual measuring value detection. Changing the corresponding parameter or actually determining the parameter value of the sensor 100 (or the first sensor element 110) is performed by the second sensor element 130 which in embodiments of the present invention is, for this purpose, spatially arranged to be as close as possible to the first sensor element 110, ideally directly neighboring thereto. In order to provoke, if applicable, a most locally limited change in the parameter value, this similarly also applies for the optional parameter changing means 140, if implemented.

Should a corresponding implementation of parameter changing means 140 not be requested, the processing circuit 120 may also cause a corresponding parameter change of the first sensor element 110 indirectly, exemplarily by changing a supply power, such as, for example, by increasing or reducing same.

Embodiments of the present invention are thus based on the basic idea that an improvement in the measuring results of a sensor 100, while at the same time simplifying the manufacturing method or calibration method of the sensor 100, can be achieved by being able to limit the complex series tests for determining absolute correction values to a single initial correction value at an initial parameter value. A correction value approximation course is, with regard to at least first and second parameter ranges, determined or established section after section having at least a first sub-section and a second sub-section, the first sub-section being based on the predetermined initial correction value and an also predetermined first parameter coefficient. For the second parameter range and the respective second sub-section of the correction value approximation course which may, with regard to the parameter values, exemplarily follow the first parameter range of the first sub-section or abut thereon, the second sub-section can be established by determining a first measuring signal value at a first parameter value and a second measuring signal value at a second parameter value. Here, the second parameter value emerges from the first parameter value by changing the respective parameter value. Since, as has been explained, there is a substantial difference between correction values and correction value approximations on the one hand, and measuring values and measuring signal values on the other hand, the second sub-section is established indirectly or directly based on the predetermined initial correction value.

The resulting advantage is that in embodiments of the present invention both a simplified calibration method for determining the initial correction value and the first parameter coefficient can be done in the works, wherein compared to a correction value approximation course which is based only on these two values determined in the calibration test, a significantly improved measuring precision can be achieved. Additionally, embodiments of the present invention also allow improved compensation relative to great parameter ranges, as exemplarily occur with regard to sensors in the automobile sector, in the nautical sector, in the aviation sector and in many other technological applications. Using an embodiment of the present invention implemented as a method for determining, section after section, a parameter-dependent correction value approximation course and the respective sensors, the measuring precision can also be improved significantly in ranges relative to the operating parameters which are only accessible using an extrapolation.

Expressed differently, embodiments of the present invention allow using sensors in an operating parameter range for which no initial correction values and parameter coefficients are determined in a series test or corresponding calibration and test measurements. Another advantage of embodiments of the present invention is that compensation of aging effects as may occur in sensors can be done by correspondingly determining a sectioned parameter-dependent correction value approximation course regularly, such as, for example, after a certain time interval elapsing, responsive to a corresponding CPU (central processing unit) instruction or another processor-based instruction, when switching the sensor on. The parameter coefficients established in this way, or the sub-sections of the correction value approximation course determined in this manner can be saved in a storage for further usage. Thus, embodiments of the present invention allow, if requested, regularly performing monitoring and optionally correcting the correction value approximation courses or sub-portions thereof.

Figure 3:
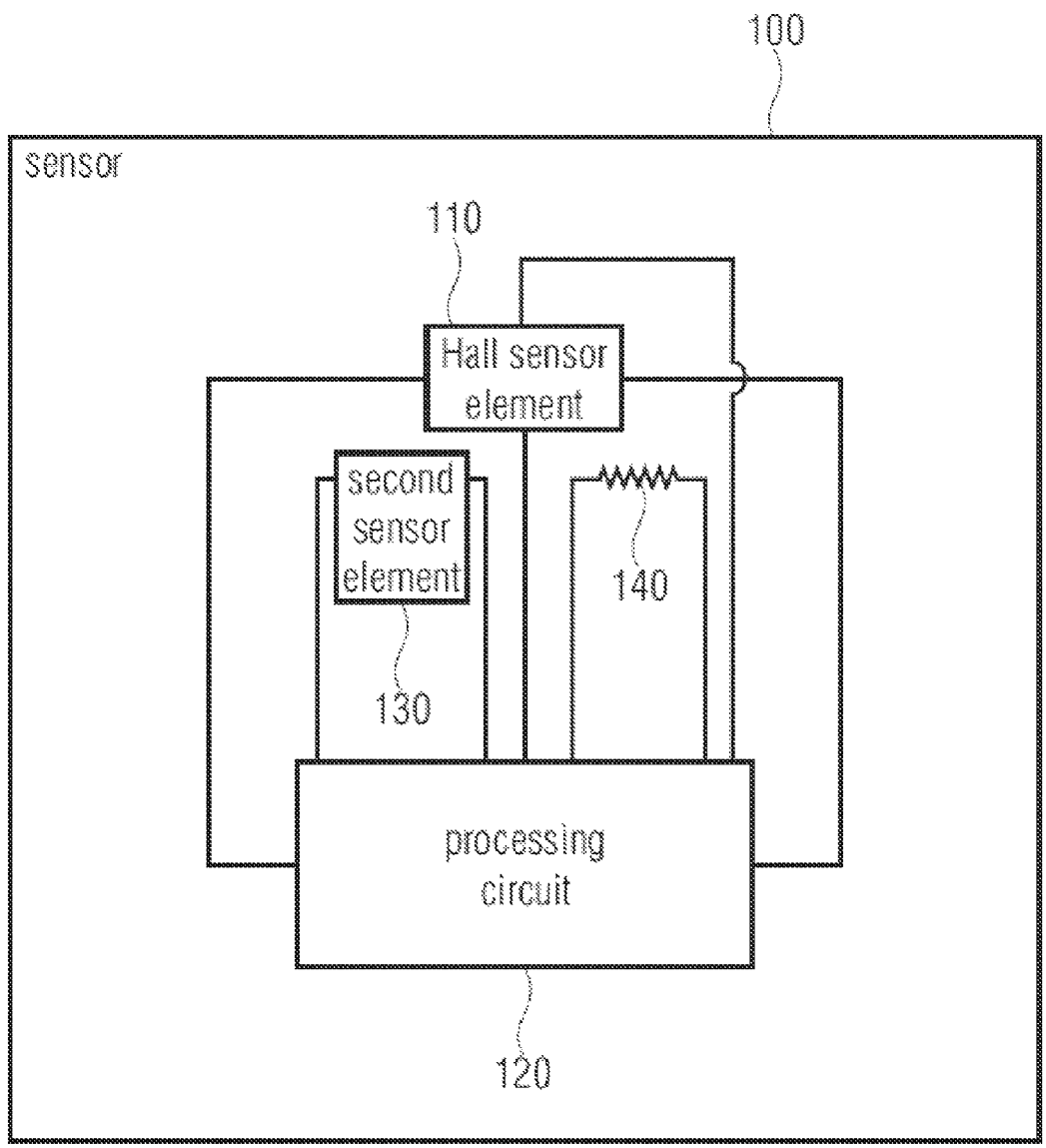
FIG. 3 shows a block diagram of an embodiment of a Hall sensor arrangement.
Figure 4:
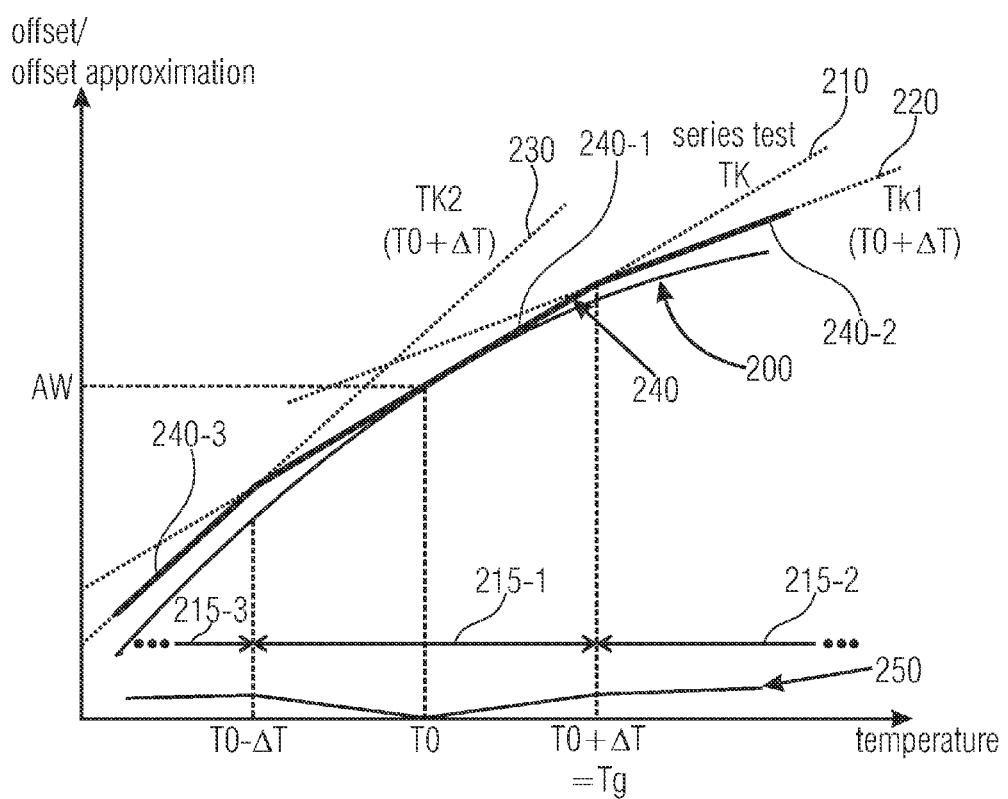
FIG. 4 exemplarily shows a comparison between a temperature-dependent correction value course and a correction approximation course determined section after section.

Even when in the embodiments of the present invention, which will follow in FIGS. 3 and 4, Hall sensors or Hall sensor arrangements will be described exemplarily, this only is a single embodiment of the present invention which is not to be interpreted as being limiting. The embodiments shown in the following FIGS. 3 and 4 are about a magnetic field sensor in which the temperature or temperature values are used as parameter values in an offset compensation as a correction value approximation. Embodiments of the present invention are of course not limited to Hall sensors and the temperature dependence of the offset values thereof, but may be applied to a plurality of different sensors and corresponding parameters.

Hall sensors may exemplarily exhibit a mostly great and additionally strongly temperature-dependent offset. Such an offset may fundamentally be reduced using the so-called spinning current principle (SC), however, what frequently remains is a temperature dependence of the spinning current offset. The spinning current principle is continually cyclically turning (exemplarily by 90°) at a certain clock frequency the measuring direction for detecting the Hall voltage at the Hall sensor element of the sensor and summing up over all the measuring signals of a complete turn by 360°.

FIG. 3 shows a block diagram of a Hall sensor 100 comprising a Hall sensor element as a first sensor element 110. In the embodiment of the present invention shown in FIG. 3, the Hall sensor element 110 is exemplarily coupled to a processing circuit 120 for controlling and for evaluating the sensor signals of the Hall sensor element 110 via four terminals each offset by 90°. In the present invention, two components coupled to each other are meant to be components which are connected to each other directly or indirectly via another component (such as, for example, a resistor, amplifier).

The Hall sensor 100 additionally comprises a temperature sensor element 130 as second sensor element, which in the embodiment shown in FIG. 3 is a resistor element. Depending on the specific implementation, the temperature sensor element may be a PTC (positive temperature coefficient) resistor element, an NTC (negative temperature coefficient) resistor element or another respective resistor element, exemplarily on the basis of a semiconductor compound. Additionally, the Hall sensor 100 comprises, as parameter changing means 140, a heating element 140 as a switchable heat source. Such a heating element may exemplarily be implemented as a resistor element having a corresponding electrical resistance.

It is thus characteristic of embodiments of the present invention that an offset temperature coefficient TK (parameter coefficient) and an absolute value AW of the offset (initial correction value) are established only at one temperature T0 (initial parameter value) on the chip in the series test using the temperature sensor element 130. Additional measurements at different temperatures during the series test are no longer needed and may thus be saved. Starting from this first test measurement in the series test calibration, calibration over the complete operating temperature range will only be done during operation of the sensor 100.

The following mode of functioning already described will be employed here. Starting from the known values AW and TK of the offset, the sensor 100 operates with practically no offset close to the series test temperature. Using the temperature sensor element 130, the operating temperature can be monitored during operation by the processing circuit 120. Should same change by a certain magnitude ΔT, another offset temperature coefficient, namely the second parameter coefficient, will be established on the chip. In this way, the offset course relative to the temperature may in principle be simulated or approximated over any number of straight lines or other functional associations.

FIG. 4 shows a schematic comparison between an offset course (correction value course) of a sensor 100 and an offset course simulated by three straight lines as a correction value approximation course determined section after section. More explicitly, FIG. 4 shows plotting of correction values and correction value approximations in dependence on a temperature T. Here, a course 200 shown in FIG. 4 represents the actual offset course of the Hall sensor 100, which usually is no longer accessible during operation. Apart from this real offset course of the Hall sensor 100, a first approximation straight line 210 the course of which has been determined by the absolute value AW and the temperature coefficient TK in the series test at the temperature T0 is additionally indicated in FIG. 4. The approximation straight line 210 thus represents the first sub-section 240-1 of the approximation correction value course 240 in a first temperature range 215-1. With the foundation of this starting point of the known or predetermined absolute value AW and the temperature coefficient TK, further temperature coefficients TK2, TK3, . . . can then be determined at different temperatures so as to simulate or approximate the offset course 200.

When the temperature exemplarily exceeds a threshold temperature $T_g=T0+\Delta T$ and thus leaves the first temperature range 215-1, a first measuring signal value MW1 of the Hall sensor 100 may be determined at first at a corresponding temperature value T1 (first parameter value) in the method described before. Subsequently, by controlling the heating element 140, the temperature can be increased by another value which exemplarily is small compared to the temperature value $\Delta T$ in order to detect a second (measuring) signal value MW2 at this temperature value T2 serving as the second parameter value. With the first measuring value MW1 at the temperature T1 and the measuring value MW2 at the temperature T2, the result will be a second temperature coefficient in a second temperature range 215-2 at temperatures of greater than $(T0+\Delta T)$ in accordance with:

$$TK1 = \frac{\Delta MW}{\Delta TEMP} = \frac{MW1-MW2}{T1-T2} \quad (2)$$

as the gradient of a corresponding approximation straight line as sub-section 240-2 of the correction value approximation course 240.

Thus, a second sub-section 240-2 of the correction value approximation course can be determined on the basis of the second temperature coefficient TK2 by exemplarily continuously continuing the approximation straight line 210 and a second approximation straight line 220 at the temperature $T_g=(T0+\Delta T)$, as is also illustrated in FIG. 4. By dealing analogously with a third temperature range 215-3 (third parameter range or another parameter range) at temperatures T below the temperature $T0-\Delta T$, a third sub-section 240-3 of the correction value approximation course 240 determined section after section which is indicated in FIG. 4 as the third approximation straight line 230 can be established or determined. Here, the temperature range between the temperatures $T0-\Delta T$ and $T0+\Delta T$ represents the first temperature range or the first parameter range, whereas the temperature ranges below the first mentioned temperature value or temperature range above the second mentioned temperature value represent the second and third temperature ranges, respectively, using which the offset of the Hall sensor 100 is simulated. In FIG. 4, this offset simulation is emphasized in bold type using three straight lines as the sectioned correction value approximation course 240.

Additionally, FIG. 4 shows a course 250 of a residual offset after calibration using the method described before on the basis of an offset simulation 240 which illustrates the improvement achieved in the temperature ranges above the temperature $T0+\Delta T$ and below the temperature $T0-\Delta T$. Thus, in these two regions, the residual offset course 250 snaps off clearly compared to the course within the first temperature range between $T0-\Delta T$ and $T0+\Delta T$, which illustrates the improvement in the precision of the sensor 100.

The basis for this on-chip calibration of the temperature coefficients TK, here of the temperature coefficient TK1, is the switchable heat source 140. Using same, the Hall sensor can be heated during operation. When the temperature difference $\Delta TEMP$ and the measuring value difference $\Delta MW$ are known, the temperature coefficient can be determined.

A considerable advantage as has already been mentioned is the fact that only the absolute value AW has to be measured in the field-free space in the embodiment of the present invention described in connection with FIG. 4. The temperature coefficients TK, TK1, TK2 can, in contrast to the absolute value AW, also be measured with a magnetic field applying, since they are, in a good approximation, independent of the respective current measuring value. Depending on the specific implementation and application of a Hall sensor 100, it may be advisable here for the sensor 100 to be exposed to a constant magnetic field or a magnetic field which at least on average does not change, during a change in temperature by the heating element 140. Thus, in the case of a magnetic field changing periodically around a constant magnetic field value for example, integration over a period of such a changing magnetic field may also be made the basis for determining the first and second measuring signal values.

As has already been illustrated in the embodiment shown in FIG. 4, more than two temperature ranges or parameter ranges including the respective sub-sections may of course be employed for simulating the correction value course. Basically, the more temperature coefficients TK are measured or determined, the more precise the simulation and the lower a potentially occurring residual offset.

The embodiments of the present invention described in connection with FIGS. 3 and 4 thus represents an automatic calibration of the temperature-dependent offset in Hall sensors 100 using an on-chip determination of the respective temperature coefficients TK. Apart from using a heating element 140, as has been the case in the embodiment of the present invention shown in FIG. 3, any other circuit part, i.e. even the first sensor element 110 or the Hall sensor 110 itself, may be used as switchable heat source. The higher the dissipated power in the Hall sensor element 110, the faster the heating in the respective Hall sensor, for example. One or several temperature coefficients can be determined correspondingly faster. Basically, it is possible to reduce the temperature of the Hall sensor element compared to a temperature value during normal operation (normal operation mode or state) by switching circuit parts off for example. In such a case, it has to be kept in mind with regard to using equation (2) or determining the temperature coefficients, that in this case the respective sign of the temperature change is taken into consideration. This means that, in this case, it has to be provided for that there is a negative temperature change. Apart from using heating elements, like, for example, electrical resistors or other switchable heat sources, a temperature change may also be caused by increasing or reducing the power of the sensor, sensor arrangement, sensor elements or other parts of the circuit. Of course, cooling elements, such as, for example, a Peltier element, may also be used here.

As has already been discussed, different parameters than the temperature may be employed when correcting the measuring value or determining a parameter-dependent correction value approximation course section after section. Apart from temperature, pressure, mechanical deformations or other parameters depending on the environment or operation may exemplarily be used. Examples of this are electrical voltages, electrical currents, but also chemical environmental parameters (such as, for example, oxygen contents of the environment).

When one or several ones of the parameters mentioned before have an influence on the sensor, the sensor arrangement or the respective sensor element itself, same can be determined by a corresponding sensor element 120 and potentially be influenced directly or indirectly via another parameter, a corresponding determination, section after section, of a parameter-dependent correction value approximation course can be performed using embodiments of the present invention. In the case of pressure or another mechanical influence on the sensor, the sensor arrangement or the sensor element itself, a piezo-element may exemplarily be used as parameter changing means 140.

Apart from using approximation straight lines as described in FIG. 4, other functional associations may also be used for formally describing parameter dependencies of the correction value approximation course. As has been discussed before, the absolute correction values are generally not accessible, however, it is possible to establish, using parameter coefficients and other correction value approximations determined from sub-sections, mathematical functions or functional associations which simulate the real correction value course which cannot be obtained. Corresponding formulae and mathematical associations can also be used in sub-sections of the correction value approximation course. Using the measuring signal values MW1 (first measuring signal value) and MW2 (second measuring signal value) determined using the two parameter values $p_1$ (first parameter value) and $p_2$ (second parameter value), a parameter coefficient pK in the respective parameter range 215 in which at least the parameter value $p_1$ is can be established on the basis of equation (1). On the basis of these parameter coefficients pK, sub-sections of the correction value approximation course may then be described by means of polynomial functions, rational functions (quotient of two polynomial expressions), exponential functions, hyperbolic functions, harmonic functions or other combinations of corresponding functions.

In the case of a degree N polynomial expression, N being a positive integer, this will be explained in greater detail. Polynomial expressions are based on an expression in accordance with:

$$f(p) = \sum_{k=0}^{N} a_k \cdot p^k, \qquad (3)$$

p being a parameter value, f(p) being a value of the polynomial expression at the parameter value p, $a_k$ being a real-value coefficient and k being an integer in a range between 0 and N. In the case of describing sub-sections as straight lines (N=1), two parameters ($a_0$, $a_1$) have to be set for each one of the sub-sections. Consequently, in the case of straight lines, two conditions are to be made to the respective course of the sub-section. In the case of parabolae (N=2), three parameters including three conditions are to be set in correspondence. Expressed generally, in the case of degree N polynomial expressions, (N+1) conditions are to be made to each of the sub-sections, since the same number of parameters have to be determined for each of the sub-sections. Here, in each parameter range, at least one condition can be fulfilled by the parameter coefficient in accordance with equation (1). Depending on the number of the further coefficients of the polynomial expression to be determined, further conditions are to be made, such as, for example, to the continuity of the individual sub-sections relative to one another, differentiability of the individual sub-sections at the respective boundaries of the parameter ranges underlying the sub-sections and/or relative to the initial correction value as the absolute value for polynomial courses. It is also possible to demand continuity or differentiability as (further) boundaries conditions with regard to higher derivatives of the respective polynomials or functional associations.

In the present description, continuous and differentiable are meant in a mathematical sense, wherein corresponding jumps which are to be attributed to noise, quantizing effects or other effects limiting the resolution are not taken into consideration as such. Expressed differently, this means that in a parameter-dependent correction value approximation course determined section after section, or even within the individual parameter ranges, the sub-sections thereof are continuous when there is, for all the parameters of the respective parameter range or the parameter ranges for each correction value approximation value, for all (mathematically definable) intervals around this value, there is another (mathematically definable) interval including the respective parameter value so that, for all the parameter values within this further interval, the respective correction value approximation values are within the first interval. Here, the limitation, as explained before, with regard to noise, resolution, or quantizing, may result in the respective intervals to be limited with regard to their quantity to small values or to great values. In complete analogy, in the present description, differentiability here means continuity of a (mathematically definable) derivative of the correction value approximation course or the sub-sections thereof. When such a mathematically definable derivative cannot be defined in a practical way, in the present description, the term of differentiability is extended to corresponding differential curves wherein differences with regard to the parameter values of neighboring parameter and correction value approximation values are considered. The remarks discussed before with regard to noise, resolution and quantizing apply here, too.

In case of the embodiment illustrated in FIG. 4 considering degrees (degree of the polynomial N=1), thus for example the first partial section of the correction value approximation course may be described by an equation $$f_1(p)=pk_1 \cdot (p-p_0)+f_0 \qquad (4)$$

wherein in contrast to the embodiment illustrated in FIG. 4 a parameter p and not a temperature T is assumed. Here, $f_1(p)$ is a value of the first partial section with a parameter value p, $pk_1$ is the first parameter coefficient and $p_0$ the initial parameter value, wherein the initial correction value $f_0$ in the calibration measurements and/or test measurements was determined in a series test for the corresponding sensor 100. If the parameter value p exceeds a threshold with regard to the parameter values $p_g$ and thus changes into a second parameter range across which a second partial section of the correction value approximation course is defined or is to be defined, based on the previously discussed conditions of the two for a parameter to be currently determined the necessity results to define two boundary conditions regarding the correction value approximation course and accordingly determine the corresponding parameters. In case of two directly adjacent parameter ranges with the parameter boundary value $p_g$, a coefficient of the general degree formula according to equation (3) (with N=1) may be determined on the basis of the inclination and/or the parameter coefficient according to a corresponding application of equation (1) by two measurement values MW1, MW2 with the parameter values $p_1$, $p_2$. As a second boundary condition regarding the coefficient of the straight line, in addition to that the continuity of the overall correction value approximation course may be requested. Based on the polynomial description of the individual partial sections, this request is easily fulfilled within the individual parameter ranges. Thus, the second coefficient of the straight line may be determined on the basis of the continuity requirement at the boundary parameter value $p_g$ between the two partial sections of the correction value approximation course. Thus, for the second partial section the following results $$f_2(p)=pk_2\cdot(p-p_g)+pk_1\cdot(p_g-p_o)+f_o, \quad (5)$$

wherein $pk_2$ is the second parameter coefficient for the second parameter range determined according to equation (1) and $f_2(p)$ is a value of the second partial section for the parameter value p in the second parameter range underlying the second partial section.

Alternatively, of course, also in other embodiments of the present invention another second condition regarding the coefficients of the straight line may be set. There might, for example, also have been the request that the straight line representing the second partial section, being extrapolated, also should have passed through the initial correction value $f_0$ with the initial parameter value $p_0$. In this case, instead of equation (5) an equation basically corresponding to equation (4) would result in which instead of $f_1(p)$ the value of the second partial section $f_2(p)$ and instead of the first parameter coefficient $pk_1$, the second parameter coefficient $pk_2$ would have had to be used.

This way it is possible to define not only two partial sections of the parameter-dependent correction value approximation course which was determined section after section. It is rather possible, as already indicated in FIG. 4, to introduce many parameter ranges with underlying partial sections. Depending on the used functional connections underlying the individual partial sections, thus a traverse and/or a polygonal description (by sections) of the correction value approximation course as a whole results. In case of the use of continuous and differentiable correction value approximation courses, analogue to that, if applicable, also a "smooth" course differentiable at the boundaries of the corresponding parameter ranges may result. Such an implementation may already be achieved by the use of parabolic (polynomial degree N=) functional connections.

Depending on the concrete implementation of embodiments of the present invention, it may, apart from that, be obvious to restrict the number of different parameter ranges and the associated partial sections of the correction value approximation course. Thus, it may be advisable, for example, not to classify the maximum admissible operation parameter range and/or parameter range into more than 50, 30, 20 or 10 parameter ranges, for example to save memory space, guarantee an efficient implementation or restrict the number of calibration processes. In other words, in some embodiments of the present invention a maximum admissible parameter range may maximally be classified into a predetermined number of individual parameter ranges and associated partial sections of the correction value approximation course, wherein this predetermined number is typically a natural number greater than 2.

In embodiments of the present invention there is apart from that the possibility to compensate aging effects. For this purpose, a trigger condition may be implemented, which leads to the execution of a corresponding determination, section after section, of a parameter dependent correction value approximation course. By this, for example in regular intervals, i.e., e.g., when a predetermined time period elapses, when switching on the sensor or with every n-th switch-on, the method for a determination of a parameter dependent correction value approximation course, section after section, may be executed, wherein n is an integer number greater than or equal to 1. Depending on the parameter value present at this point in time, then according to the described method, a second partial section of the correction value approximation course may be determined, which may also lead to a finer classification of the maximum accessible parameter range by several parameter ranges. In addition to that, in further embodiments of the present invention, also the predetermined first parameter coefficient may, if applicable, be adapted or recalibrated, as far as the same is stored in a memory accordingly included in the sensor 100 which enables a re-writing and/or storing of this value. Thus, for example the processing circuit 120 may for these values, for example, be stored in a non-volatile memory wherein these values may be subject to aging and thus be accessible for recalibration. Such non-volatile memories are, for example, flash memories, EEPROM memories (electrically erasable programmable read only memories). If, however, the sensor 100 is in its "normal sensor life" typically not separated from a supply voltage, an implementation of a non-volatile memory may also be replaced by a volatile memory. If the first parameter coefficient is newly determined, it may be advisable to again determine also the further partial sections (as far as needed) to further fulfill continuity or other boundary conditions, if applicable.

Even if, in particular in connection with FIGS. 3 and 4, an embodiment of the present invention was described in the form of a hall sensor 100 with one single hall sensor element 110, embodiments of the present invention are of course not limited to sensors or hall sensors 100 with one single sensor element. In further embodiments, thus also several hall sensor elements may be used as a replacement for the single hall sensor element 110 illustrated in FIG. 3. The same may, for example, be interconnected in the form of serial, parallel circuits or more complex circuits. Further, different (hall) sensor types may be interconnected.

Further, embodiments of the present invention are not limited to hall sensors. Thus, other magnetic field sensors, for example any magneto-resistive sensors (xMR sensors), i.e., for example AMR sensors (anisotropic magneto resistance), GMR sensors (giant magneto resistance), TMR sensors (tunnel magneto resistance) or EMR sensors (extraordinary magneto resistance) may be used. But also other sensors, like for example pressure sensors, acceleration sensors or sensors responsive to mechanical, electrical, radiation-conditioned or physical effects may be used within the scope of embodiments of the present invention. In addition to that, corresponding sensors 100 may also be ones which respond to chemical or biological effects and processes.

In different embodiments of the present invention, the sensors 100 may, for example, with the help of the processing circuit 120, convert a measurement signal received from the first sensor element 110 into an output signal of the sensor 100, by correcting the output signal depending on the parameter signal of the second sensor element 130 on the basis of the correction value approximation course. For this purpose, for example the measurement value included in the measurement signal of the first measurement element 110 may be changed by addition and/or subtraction, multiplication or also by division by the value of the correction value approximation course in the corresponding parameter value of the parameter signal. Thus, for example, an offset correction and/or a scaling correction may be executed.

Embodiments of the present invention may, in addition to that, be realized as integrated circuits (IC), as a discreet implementation using individual, discrete electrical and electronical circuit elements or in combination of both technologies. In addition to that, embodiments of the present invention may be executed on the basis of an analogue and/or a digital signal processing. Depending on the respective implementation, thus for example an implementation of analogue/digital converters, digital filters and maybe a digital/analogue converter may be advisable. Also, different embodiments of the present invention may include analogue preamplifiers, amplifiers, electric filters and other analogue components.

In addition to that, embodiments of the present invention may be implemented in larger integrated circuits or also as individual sensor ICs. Also an implementation in so-called ASICs (application specific integrated circuits) is possible, which include individual processor circuits or processors depending on the field of application. In such a case, for example, an embodiment of a method for a determination, section after section, of a parameter dependent correction value course, or another embodiment of the present invention may be implemented in software or firmware, which then runs on the processor or the processing circuit. Examples for this are intelligent sensors which are manufactured as ASIC or as IC with corresponding sensors, sensor elements and/or sensor arrangements.

Thus, embodiments of the present invention for example enable an offset reduction with hall sensors, which may for example be of interest in the field of automotives (applications in the motor vehicle field) with its high temperature requirements. The above described functioning in particular with hall sensors 100 may, as explained above, of course be applied to any type of sensor with a temperature-dependent or parameter-dependent offset. Thus, an automatic calibration of a temperature-dependent or parameter-dependent offset may take place with any type of sensors with a corresponding offset.

Depending on the conditions, embodiments of the inventive method may be implemented in hardware or in software. The implementation may be on a digital storage medium, in particular a floppy disc, CD or DVD having electronically readable control signals which may cooperate with a programmable computer system so that embodiments of the inventive method are executed. In general, thus embodiments of the present invention also consist in a computer program product and/or a software program product and/or a program product having a program code stored on a machine readable carrier for executing an embodiment of the inventive method when the software program product runs on a computer or a processor. In other words, embodiments of the present invention may thus be realized as a computer program and/or software program and/or program having a program code for executing an embodiment of a method when the program runs on a processor. The processor may here be formed by a computer, a chip card (smart card), an ASIC, an intelligent sensor or another integrated circuit.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method of determining, section after section, a parameter-dependent correction value approximation course for a measurement signal correction of a sensor arrangement, wherein with regard to an initial parameter value an initial correction value and a first parameter coefficient are given, and wherein the correction value approximation course comprises a first partial section for a first parameter range which is based on the initial correction value and the first parameter coefficient, comprising:
   determining a first measurement signal value with a first parameter value associated with the sensor arrangement, when the first parameter value fulfils a predetermined condition or a trigger condition is fulfilled;
   changing the first parameter value associated with the sensor arrangement to acquire a second parameter value associated with the sensor arrangement;
   determining a second measurement signal value with the second parameter value; and
   determining a second partial section of the correction value approximation course for a second parameter range based on a functional connection describing the second partial section considering the first and the second parameter value, the first and the second measurement signal value and the initial correction value,
   wherein the second partial section of the correction value approximation course is determined so that the first parameter range is adjacent to the second parameter range; and
   wherein the first partial section and the second partial section of the correction value approximation course are continuously adjacent to each other.

2. The method according to claim 1, which is executed during the operation of the sensor arrangement.

3. The method according to claim 1, wherein a further partial section of the correction value approximation course is determined for a further parameter range, so that the further parameter range is adjacent to the first or the second parameter range.

4. The method according to claim 3, wherein the further partial section of the correction approximation course is determined so that the further parameter range is adjacent to the first parameter range and which further comprises:
   determining a further first measurement signal for a further first parameter value of the further parameter range;
   changing the further first parameter value to acquire a further second parameter value;
   determining a further second measurements signal with the further second parameter value; and
   determining the further partial section of the correction value approximation course for the further parameter range based on a functional connection describing the further partial section considering the further first and the further second parameter value, the further first and the further second measurement value and the first partial section,
   wherein the determination is executed so that the further partial section of the correction value approximation course is continuously adjacent to the first partial section.

5. The method according to claim 3, wherein the further partial section of the correction approximation course is determined so that the further parameter range is adjacent to the second parameter range and further comprises:
   determining a further first measurement signal for a further first parameter value of the further parameter range;
   changing the further first parameter value to acquire a further second parameter value;
   determining a further second measurement signal in the further second parameter value; and
   determining the further partial section of the correction value approximation course for the further parameter range based on a functional connection describing the further partial section considering the further first and the further second parameter value, the further first and the further second measurement signal value and the second partial section, wherein the determination is executed so that the further partial section of the correction value approximation course is continuously adjacent to the second partial section.

6. The method according to claim 1, wherein as a parameter value a temperature value or a pressure value is used.

7. The method according to claim 1, wherein the predetermined condition is fulfilled when the first parameter value is not in the first parameter range.

8. The method according to claim 1, wherein the trigger condition is fulfilled by switching on or after switching on the sensor arrangement.

9. The method according to claim 1, wherein the first or the second partial section of the correction approximation course is described based on the functional connection $$f(p) = \sum_{k=0}^{N} a_k \cdot p^k$$

wherein p is a parameter value, f(p) is a value of the first or the second section of the correction approximation course with the parameter value p, N is a positive integer number indicating an order of a polynomial, ak is a real constant depending on k and k is an integer number between 0 and N.

10. The method according to claim 9, wherein N=1, 2 or 3.

11. The method according to claim 1, wherein the first section of the correction value approximation course is described based on the functional connection $f_1(p)=pk_1 \cdot (p-p_g)+pk_1 \cdot (p_g-p_0)+f_0$ and the second section of the correction approximation course is described on the functional connection $f_2(p)=pk_2 \cdot (p-p_g)+pk_1 \cdot (p_g-p_o)+f_o$ wherein p is a parameter value, f1(P) a value of the first section of the correction approximation course with the parameter value p, f2(p) is a value of the second section of the correction approximation course with the parameter value p, pk1 is the first parameter coefficient, f0 the initial correction value, pk2 a second parameter coefficient based on the first parameter value, the second parameter value, the first measurement signal value and the second measurement signal value, and pg is a threshold parameter value, wherein a parameter range underlying the first section of the correction approximation course is adjacent to a second section of the correction value approximation courser underlying the second section of the correction value approximation course underlying the second section of the correction value approximation course.

12. The method according to claim 1, wherein the step of changing the first parameter value comprises controlling a heating element, controlling a cooling element, controlling a pressure element, increasing a supply power of the sensor arrangement, a sensor element of the sensor arrangement or a part of the sensor arrangement or reducing the supply power of the sensor arrangement, the sensor element of the sensor arrangement or a part of the sensor arrangement.

13. The method according to claim 1, wherein the parameter is a temperature, the sensor arrangement is a hall sensor arrangement, the initial correction value is an initial temperature value T0, the first parameter coefficient is a first temperature coefficient, the first parameter range is a first temperature range, the second parameter range is a second temperature range, the first parameter value is a first temperature value and the second parameter value is a second temperature value.

14. A sensor arrangement, comprising:
a first sensor element for providing measurement signals;
a second sensor element for providing parameter signals; and
a processing circuit coupled to the first and the second sensor element and implemented to detect measurement signals from the first sensor element and parameter signals from the second sensor element and,
wherein the processing circuit is further implemented to determine a first measurement signal with a first parameter value associated with the sensor arrangement and corresponding to a first parameter signal, when the first parameter value fulfils a predetermined condition or a trigger condition is fulfilled;
wherein the processing circuit is further implemented to change the first parameter value associated with the sensor arrangement to acquire a second parameter value associated with the sensor arrangement and corresponding to a second parameter signal;
wherein the processing circuit is further implemented to determine a second measurement signal value with the second parameter value; and
wherein the processing circuit is further implemented to determine a second partial section of the correction approximation course in a second parameter range which is based on a functional connection describing the second partial section, considering the first and the second parameter value, the first and the second measurement signal value and an initial correction value,
wherein a first partial section of the correction value approximation course in a first parameter range is based on the predetermined initial correction value and the first predetermined parameter coefficient;
wherein the second partial section of the correction value approximation course is determined so that the first parameter range is adjacent to the second parameter range; and
wherein the first partial section and the second partial section of the correction value approximation course are continuously adjacent.

15. The sensor arrangement according to claim 14, wherein the processing circuit is implemented to cause the change of the first parameter value by increasing a supply power of the sensor arrangement, the first sensor element, the second sensor element or a part of the sensor arrangement or by reducing the supply power of the sensor arrangement, the first sensor element, the second sensor element or a part of the sensor arrangement.

16. The sensor arrangement according to claim 14, further comprising an additional parameter changer which is coupled the processing circuit, and wherein the processing circuit is further implemented to provide a signal to the parameter changer to cause a change of the first parameter value.

17. The sensor arrangement according to claim 16, wherein the parameter changer is arranged adjacent to the first sensor element to make a parameter change with regard to the first sensor element producible.

18. The sensor arrangement according to claim 16, wherein the parameter changer comprises a heating element, a piezo element, a cooling element or a Peltier element.

19. The sensor arrangement according to claim 14, wherein the first sensor element comprises a Hall sensor.

20. The sensor arrangement according to claim 14, wherein the second sensor element comprises a temperature sensor, a PTC resistance element, an NTC resistance element, a pressure sensor element or a piezo element.

21. The sensor arrangement according to claim 14, wherein the processing circuit is further implemented to output an output signal based on a measurement signal, wherein the output signal is corrected depending on a parameter value comprised in a parameter signal depending on the correction value approximation course.

22. The sensor arrangement according to claim 14, wherein the sensor arrangement is a Hall sensor arrangement, the first sensor element is a Hall sensor element, the second sensor element is a temperature sensor element and the processing circuit is implemented so that the parameter is a temperature, the initial correction value is an initial temperature value, the first parameter coefficient is a first temperature coefficient, the first parameter range is a first temperature range, the second parameter range is a second temperature range, the first parameter value is a first temperature value and the second parameter value is a second temperature value.

23. A tangible computer readable medium including a program including a program code for executing, when the program is executed on a processor, a method of determining, section after section, a parameter-dependent correction value approximation course for a measurement signal correction of a sensor arrangement, wherein with regard to an initial parameter value an initial correction value and a first parameter coefficient are given, and wherein the correction value approximation course comprises a first partial section for a first parameter range which is based on the initial correction value and the first parameter coefficient, comprising:
- determining a first measurement signal value with a first parameter value associated with the sensor arrangement, when the first parameter value fulfils a predetermined condition or a trigger condition is fulfilled;
- changing the first parameter value associated with the sensor arrangement to acquire a second parameter value associated with the sensor arrangement;
- determining a second measurement signal value with the second parameter value; and
- determining a second partial section of the correction value approximation course for a second parameter range based on a functional connection describing the second partial section considering the first and the second parameter value, the first and the second measurement signal value and the initial correction value,
- wherein the second partial section of the correction value approximation course is determined so that the first parameter range is adjacent to the second parameter range; and
- wherein the first partial section and the second partial section of the correction value approximation course are continuously adjacent to each other.

* * * * *

UNITED STATES PATENT AND TRADEMARK OFFICE
CERTIFICATE OF CORRECTION

PATENT NO. : 8,311,760 B2
APPLICATION NO. : 12/678567
DATED : November 13, 2012
INVENTOR(S) : Hans-Peter Hohe et al.

It is certified that error appears in the above-identified patent and that said Letters Patent is hereby corrected as shown below:

In the Claims:

Please replace the formula in Column 17, Claim 11, Lines 31-33 as follows:

$$f_1(p) = pk_1 \cdot (p - p_0) + f_0$$

Signed and Sealed this
Sixteenth Day of April, 2013

Teresa Stanek Rea
*Acting Director of the United States Patent and Trademark Office*